(12) United States Patent  (10) Patent No.: US 9,195,736 B2
Mohan  (45) Date of Patent: Nov. 24, 2015

(54) SYSTEM AND METHOD FOR CONTENT STORAGE

(71) Applicant: Red Hat, Inc., Raleigh, NC (US)

(72) Inventor: Satish Mohan, Magarpatta (IN)

(73) Assignee: Red Hat, Inc., Raleigh, NC (US)

( * ) Notice: Subject to any disclaimer, the term of this patent is extended or adjusted under 35 U.S.C. 154(b) by 274 days.

(21) Appl. No.: 13/961,285

(22) Filed: Aug. 7, 2013

(65) Prior Publication Data

US 2015/0046463 A1 Feb. 12, 2015

(51) Int. Cl.
*G06F 17/00* (2006.01)
*G06F 17/30* (2006.01)

(52) U.S. Cl.
CPC .............. *G06F 17/30619* (2013.01)

(58) Field of Classification Search
USPC .............. 707/661, 654, 695, 705, 741
See application file for complete search history.

(56) References Cited

U.S. PATENT DOCUMENTS

| | | | |
|---|---|---|---|
| 7,130,867 B2 | 10/2006 | Luke | |
| 7,487,138 B2 | 2/2009 | Borthakur et al. | |
| 8,156,126 B2 | 4/2012 | Petrocelli et al. | |
| 9,053,124 B1* | 6/2015 | Dornquast et al. | 1/1 |
| 2006/0059204 A1 | 3/2006 | Borthakur et al. | |
| 2009/0282060 A1* | 11/2009 | Paulussen et al. | 707/100 |
| 2012/0102000 A1 | 4/2012 | Tosaka | |
| 2012/0150827 A1 | 6/2012 | Ishii et al. | |

OTHER PUBLICATIONS

Bloehdorn et al., "TagFS—Tag Semantics for Hierarchical File Systems," Institute AIFB, University of Karsruhe, Germany, May 22-26, 2006, 6 pages, http://site.xam.de/2006/01-tagfs.pdf.
Soules et al., "Why can't I find my files? New methods for automating attribute assignment," Proceedings of HotOS IX: The $9^{th}$ Workshop on Hot Topics in Operating Systems, Lihue, Hawaii, USA, May 18-21, 2003, 13 pages, retrieved Oct. 25, 2013 http://static.usenix.org/publications/library/proceedings/hotos03/tech/full_papers/soules/soules_html/index.html.
Raghuveer et al, "Towards efficient search on unstructured data: an intelligent-storage approach," Proceedings of the sixteenth ACM conference—Conference on Information and Knowledge Management (CIKM), 2007, 4 pages, http://dl.acm.org/citation.cfm?id=1321583.

\* cited by examiner

*Primary Examiner* — Hung T Vy
(74) *Attorney, Agent, or Firm* — Haynes and Boone, LLP

(57) ABSTRACT

A system and method of content storage includes a content store for storing a plurality of first content blocks and one or more first indexes, a content manager including one or more first content analyzers, and an interface for receiving access requests for the plurality of first content blocks. Each of the one or more first indexes includes a plurality of first entries for organizing a plurality of second content blocks from the plurality of first content blocks according to a respective organizational structure. Each of the first entries includes a link to a corresponding content block from the plurality of second content blocks. Each of the plurality of content analyzers monitors the plurality of first content blocks for changes and updates a second index from the one or more first indexes based on information associated with the monitored changes.

20 Claims, 4 Drawing Sheets

SYSTEM AND METHOD FOR CONTENT STORAGE

BACKGROUND

The present disclosure relates generally to computing systems, and more particularly to content storage.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems are typically used to store, process, and retrieve information and content. Organization and retrieval of the stored information and content is typically constrained by the storage tools and mechanisms used to store the information and content. For example, when a hierarchical file system is used to store information and content using files, location of and access to the files is largely constrained by the hierarchy of directories used to organize the files within the hierarchical file system. In another example, when a database is used to store information and content using records in tables, location of and access to the records is largely constrained by the structure of tables and the relationships between the tables. And while both the hierarchical file system and the database typically include search mechanisms, these search mechanisms are still largely constrained by the underlying organization of the information and content. More recently, attempts have been made to add metadata and other tagging features to the hierarchical file system, however, these are generally implemented as separate add-on features that often do little more than improve the search mechanisms without improving the underlying organization of the information and content.

Accordingly, it would be desirable to provide improved content storage methods and systems.

SUMMARY

According to one example, a content storage system includes a content store for storing a plurality of first content blocks and one or more first indexes, a content manager including one or more first content analyzers, and an interface for receiving access requests for the plurality of first content blocks. Each of the one or more first indexes includes a plurality of first entries for organizing a plurality of second content blocks from the plurality of first content blocks according to a respective organizational structure. Each of the first entries includes a link to a respective content block from the plurality of second content blocks. Each of the plurality of content analyzers monitors the plurality of first content blocks for changes and updates a second index selected from the one or more first indexes based on information associated with the monitored changes.

According to another example, a method of managing content blocks includes storing a plurality of first content blocks and one or more first indexes in a content store, organizing a plurality of second content blocks from the plurality of first content blocks using a second index from the one or more first indexes according to a first organizational structure, linking each of the plurality of second content blocks using respective links stored in corresponding entries of the second index, monitoring the plurality of first content blocks using a content manager including one or more first content analyzers, updating the second index using a second content analyzer from the one or more first content analyzers based on changes detected in the plurality of first content blocks, and receiving access requests for the plurality of first content blocks via an interface.

According to yet another example, a non-transitory machine-readable medium comprising a plurality of machine-readable instructions which when executed by one or more processors associated with a storage archive are adapted to cause the one or more processors to perform a method. The method includes archiving a plurality of first storage frames and one or more first registries in the storage archive, cataloging a plurality of second storage frames from the plurality of first storage frames using a second registry from the one or more first registries according to a first catalog structure, referencing each of the plurality of second storage frames using respective locators stored in corresponding entries of the second registry, monitoring the plurality of first storage frames using an archive monitor including one or more first registry updaters, updating the second registry using a second registry updater from the one or more first registry updaters based on changes detected in the plurality of first storage frames, receiving a search request including search parameters via a frame retriever, identifying one or more of the plurality of first storage frames based on the search parameters, creating a third registry based on the search parameters, adding the third registry to the one or more first registries, creating a second registry updater for updating the third registry, and adding the second registry updater to the one or more first registry updaters.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
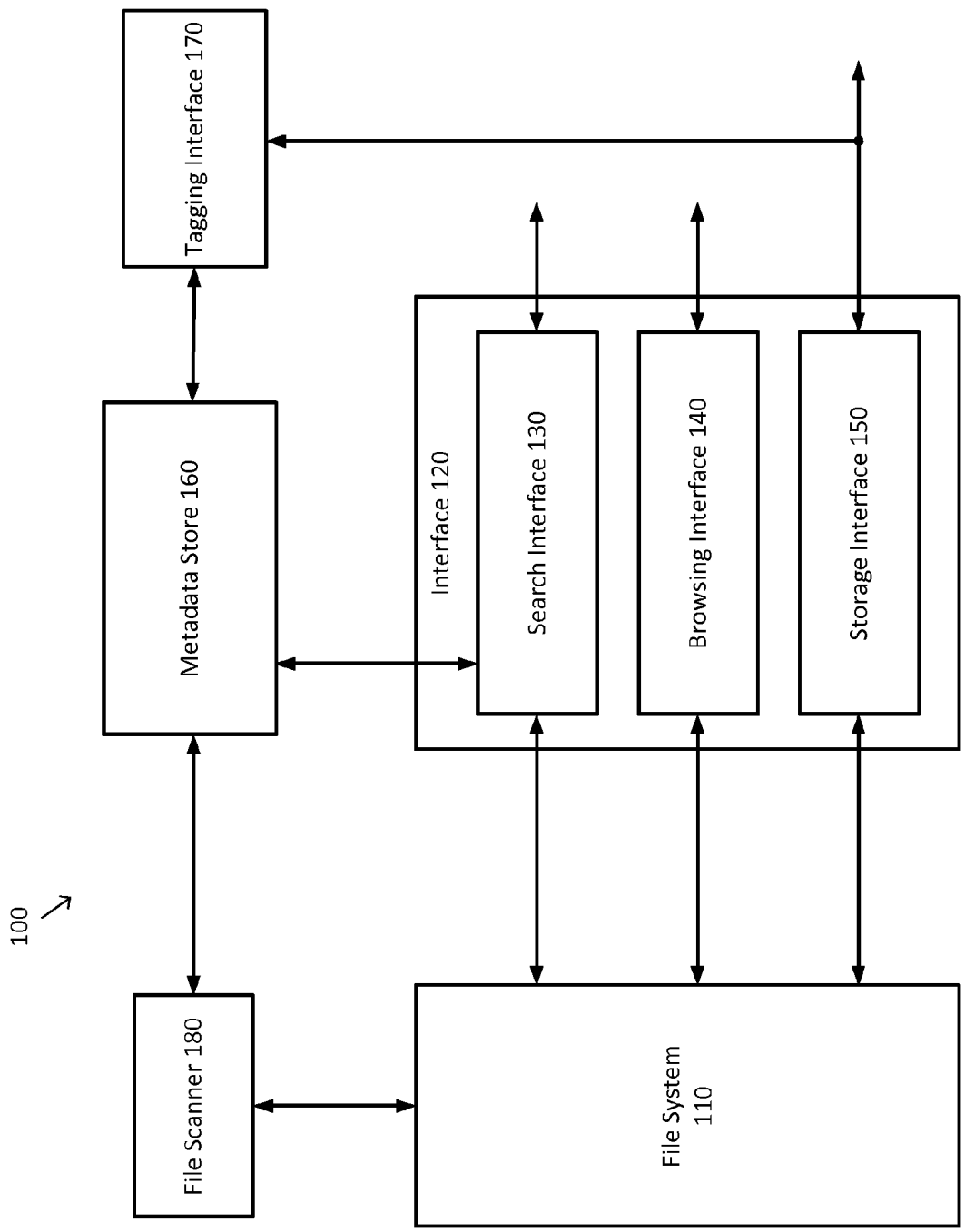
FIG. 1 is a simplified diagram of a file storage system according to some examples.

FIG. 1 is a simplified diagram of a file storage system 100 according to some examples. As shown in FIG. 1, the file storage system 100 includes a file system 110. In some examples, file system 110 may be hierarchical. In a hierarchical file system, information and content may be stored in one or more files. To help organize the files, the files may be organized hierarchically in much the same way that physical files are stored. At the highest level, the hierarchy includes a base or root directory or folder. Some files may be stored in the root directory and the root directory may include any number of subdirectories. Each of the subdirectories may include both files and other subdirectories with the hierarchy forming a tree-like structure with files and/or subdirectories at each node in the tree. For example, in the Linux operating system, the root directory may be designated as "/" and include top-level subdirectories for "/bin", "/boot", "/dev", "/usr", and the like. Each of the top-level subdirectories may include further subdirectories, for example, the "/usr" subdirectory may include subdirectories such as "/usr/bin", "/usr/local", and the like. Further, each of the subdirectories may be identified by a file path, which may identify each of the subdirectories as the directory tree is traversed beginning at the root directory. For examples, the file path "/usr/local/bin refers to the bin subdirectory of the local subdirectory of the usr subdirectory. In order to locate a file stored using file system 110, it may be necessary to navigate up and down the hierarchy tree until the subdirectory containing the desired file is reached. The hierarchical organization of file system 110 has many similarities with hierarchies used to store objects in the physical world. For example, books may be organized in a library using a hierarchy of floors, wings, rooms, rows, book cases, and shelves.

In some examples, file system 110 may be located on any kind of storage medium or machine-readable media. Some common forms of machine readable media suitable for file system 110 may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. In some examples, file system 110 may store files using blocks, extents, and/or other storage structures.

In order to access the files and other information stored in file system 110, an interface 120 may be provided. The interface 120 provides hardware and/or software interfaces that allow other devices and/or software in file storage system 100 to access file system 110. In some examples, interface 120 may include device drivers, direct memory access (DMA) units, and/or other file system access mechanisms. In some examples, interface 120 may further include software components such as application programming interfaces (APIs), operating system commands and utilities, and/or the like. Interface 120 may further include a plurality of sub-interfaces with each of the sub-interfaces providing a different type of access to file system 110. The sub-interfaces may include a search interface 130, a browsing interface 140, and a storage interface 150.

Search interface 130 may include commands and/or utilities for searching for files stored in one or more of the subdirectories in the hierarchy tree of file system 110. In some examples, search interface 130 may include commands and/or similar API calls for specifying one or more search parameters. In some examples, the one or more search parameters may include parameters for matching to all or part of a file name, content of a file, dates associated with a file, and/or the like. In some examples, the one or more search parameters may further include parameters identifying one or more subdirectories using subdirectory lists, patterns with or without wildcards, sub-trees of the hierarchy tree, and/or the like. In some examples, search interface 130 may be used to initiate a scan of each of the files in each of the designated subdirectories to find files that match the search parameters. In some examples, other software tools and utilities and/or users may use the search interface 130.

Browsing interface 140 may include commands and/or utilities for moving about the hierarchy tree of file system 110. In some examples, browsing interface 140 may include commands and/or similar API calls for changing the directory (e.g., the "cd" command), determining the contents of the directory (e.g., the "ls" and/or "dir" commands), and/or the like. In some examples, other software tools and utilities may use the browsing interface 140 for moving about the hierarchy tree. In some examples, the software tools and utilities may include file explorer dialogs, file open dialogs, and the like. In some examples, users of file storage system 100 may access browsing interface 140.

Storage interface 150 may include commands and/or utilities for reading files from and/or writing files to any of the subdirectories in the hierarchy tree of file system 110. In some examples, storage interface 150 may include commands and/or similar API calls for performing read and/or write operations to specified files in specified subdirectories. In some examples, software applications and/or users may use storage interface 150 to add information and content as a file to file system 110. For example, the software applications may include a word processing program with a file save feature.

The hierarchical structure of file system 110 may limit the usefulness of file system 110 for organizing files. When disk drives were considerably smaller than they typically are in today's file storage systems, the file storage system typically only stored a limited number of files. Users were often able to manage a hierarchy with a limited number of levels and subdirectories, by relying on experiences and skills from the physical world. Consequently, the hierarchical structure begins to lose effectiveness when it is used to store large numbers of files and/or to store unstructured information. The hierarchical structure, however, does not generally provide good support for files storing information and content that may be organized using multiple hierarchies without creating copies of each of the files for each of the multiple hierarchies. For example, it is not practical to organize books in a library using both the Dewey Decimal System and the Library of Congress Classification System without having two copies of each book.

Many operating systems include some applications and tools that attempt to compensate for the limitations of the hierarchical structure. In some examples, the operating systems may provide a mechanism for marking files as favorites and then providing direct access to the favorites using a special subdirectory. In some examples, the operating systems may provide another special subdirectory with the most recently accessed files. In some examples, the operating systems may limit the effects of duplication by supporting short cut and/or link files that include just a file path that may be used to redirect a file access to the actual file in its actual subdirectory. In some examples, the favorites and most recently accessed files subdirectories may include just short cut and/or link files. In many cases, these applications and tools may not be very robust. For example, when the actual file pointed to by a short cut or link file is deleted, moved, and/or renamed, the short cut or link may not get updated and thus no longer points to the actual file.

More sophisticated applications and tools may also be used to compensate for the limitations of the hierarchical structure of file system 110. A metadata store 160 may be used to help identify and locate files without relying solely on the hierarchy tree. In some examples, metadata store 160 may be stored using combinations of one or more files, data structures, databases, and/or the like. Metadata store 160 may be used to store the file paths of each of the files stored in file system 110 and associate the file paths with one or more metadata values from the corresponding file. In some examples, the metadata values may include keywords from file names, key words in the contents of the files, file types, and the like. In some examples, the metadata values may further include user and/or application specified tags using a tagging interface 170. Whenever files are created and/or modified an application may supply one or more tags and/or metadata values and/or a user may be prompted for metadata values in designated categories that may be associated with the file using metadata store 160. For example, metadata store 160 may be used to associate a project identifier with each file stored in file system 110. Further, when metadata store 160 is used, search interface 130 may be augmented to include the ability to add metadata search parameters to any file search. In some examples, results of a search may include a list of file paths that may be used to access the corresponding file in a fashion similar to the use of short cut and link files.

To further support metadata store 160 and/or search interface 130, file storage system 100 may further include a file scanner 180. File scanner 180 may periodically scan the files stored in file system 110 to make updates in metadata store 160. In some examples, file scanner 180 may be used to create one or more search indexes in metadata store 160 that may be used to reduce the time taken to perform a file search using search interface 130. In some examples, file scanner 180 may be used to update metadata values and/or detect incorrect file paths in metadata store 160.

According to certain examples, metadata store 160 may provide only a limited ability to compensate for the limitations of the hierarchical structure of file system 110. In some examples, because metadata store 160 is maintained separately from file system 110 it may introduce unwanted overhead to search interface 130 and/or storage interface 150. In some examples, metadata store 160 may not be fully updated between the periodic scans of file scanner 180 resulting in searches that identify non-existent or incorrect files or may even return incomplete search results that may not identify each of the matching files. In some examples, incomplete search results may be completed by initiating a full search of file system 110, but this may limit any gains from using metadata store 160. In some examples, file scanner 180 may also interfere with other operations being processed by file system 110 and interface 120, unless file scanner 180 is used during idle periods of file system 110. In some examples, when file system 110 is heavily used, this may increase an interval between successive periodic scans of file scanner 180 and further reduce the likelihood that information in metadata store 160 is not up to date.

Figure 2:
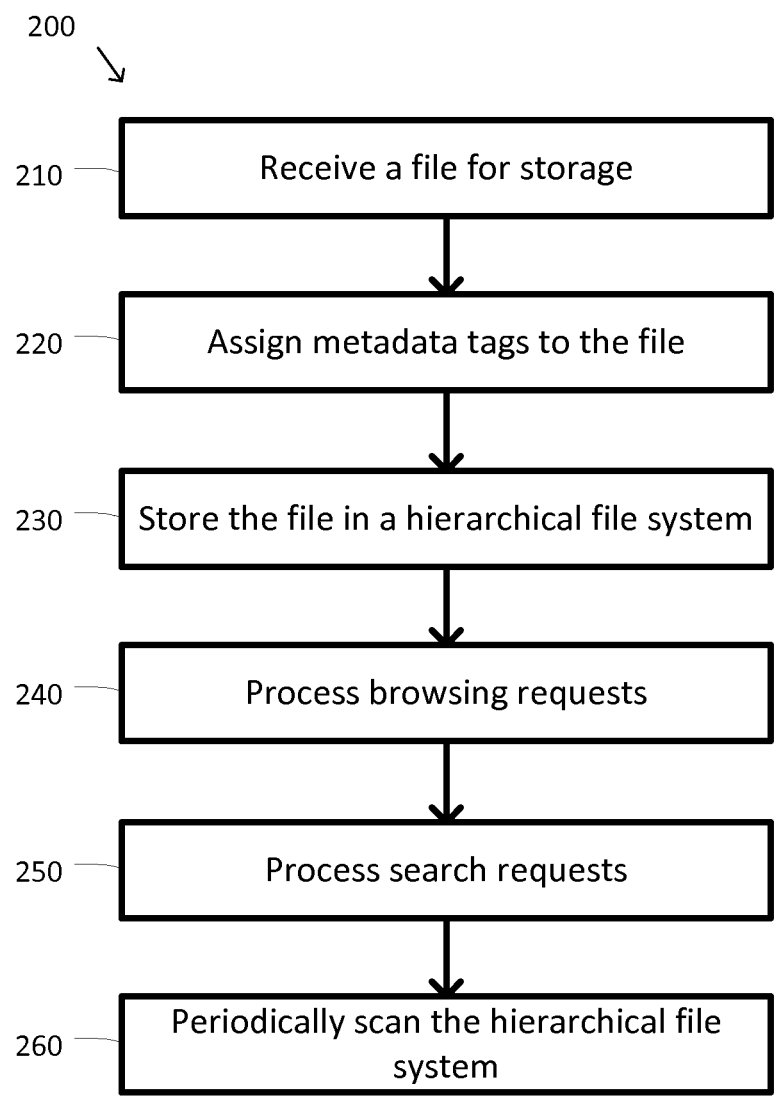
FIG. 2 is a simplified diagram of a method of managing files according to some examples.

FIG. 2 is a simplified diagram of a method 200 of managing files according to some examples. As shown in FIG. 2, the method 200 includes a process 210 for receiving a file for storage, a process 220 for assigning metadata tags to the file, a process 230 for storing the file in a hierarchical file system, a process 240 for processing browsing requests, a process 250 for processing search requests, and a process 260 for periodically scanning the hierarchical file structure. According to certain examples, the method 200 of managing files can be performed using variations among the processes 210-260 as would be recognized by one of ordinary skill in the art. In some examples, the process 220 is optional and may be omitted. In some examples, one or more of the processes 210-260 of method 200 may be implemented, at least in part, in the form of executable code stored on non-transient, tangible, machine readable media that when run by one or more processors (e.g., one or more processors in a file storage system) may cause the one or more processors to perform one or more of the processes 210-260.

At the process 210, a file is received for storage. For example, the file may be received from a save operation of an application such as a word processor, via download over a network, by copying from other storage media, and/or the like. In some examples, the file may be received using a storage interface, such as storage interface 150. In some examples, the file may be received by file storage system 100.

At the optional process 220, metadata tags may be assigned to the file. In order to facilitate identification and/or location of the file, one or more metadata tags may be assigned to the file. In some examples, the one or more metadata tags may include type information for the file, a project associated with the file, category information, urgency tags, and/or the like. In some examples, some of the one or more metadata tags may be automatically supplied by the application generating the file. In some examples, some of the one or more metadata tags may be received from a user via an input mechanism such as a dialog box. In some examples, the one or more tags may be assigned using a tagging interface, such as tagging interface 170 and stored in a metadata store, such as metadata store 160.

At the process 230, the file is stored in a hierarchical file system. Based on a file path, the file is stored in a subdirectory in the hierarchical file system. In some examples, the hierarchical file system may be file system 110. In some examples, the file path may be a current and/or default file path. In some examples, the file path may be selected by a user with the aid of a save and/or file path selection dialog.

At the process 240, browsing requests are processed. Using an interface, such as browsing interface 140, one or more browsing requests may be received and processed by the file storage system. As part of the processing, the file storage system may provide a list of one or more files matching the browsing requests. In some examples, the browsing request may include a request for the files in a current working directory such as those provided by a ls or dir command in an operating system. In some examples, processing for the browsing request may include navigating up and/or down the hierarchy of subdirectories of the hierarchical file system.

At the process 250, search requests are processed. Using an interface, such as search interface 130, one or more search requests may be received and processed by the file storage system. As part of the processing, the file storage system may provide a list of one or more files matching the search requests. In some examples, the search requests may include a request for the files in a current working directory matching a naming pattern that may include one or more wildcard characters. In some examples, processing for the search request may include navigating up and/or down the hierarchy of subdirectories and/or scanning one or more subdirectories stored in the hierarchical file system. In some examples, processing for the search request may be sped up using one or more indexes created by a previous scan of the file system using a file scanner such as file scanner 180. In some examples, processing for the search request may include matching one or more metadata tags to metadata stored in the metadata store.

At the process 260, the hierarchical file system is periodically scanned. Using the file scanner, the hierarchical file system may be periodically scanned to create the one or more indexes that are used to speed up processing of the search requests of process 250. In some examples, some of the one or more indexes may be based on keywords used in the file names of each of the files stored in the hierarchical file system. In some examples, some of the one or more indexes may be based on type information and/or other metadata tags associated with each of the files stored in the hierarchical file system. In some examples, some of the one or more indexes may be based on content stored in each of the files. In some examples, the periodic scanning may occur at regular intervals. In some examples, the period scanning may only be performed when the hierarchical file storage system is otherwise idle.

As noted above with respect to FIG. 1, method 200 may be limited in its ability to handle large amounts of files including unstructured information. The limitations of the single hierarchy, separate metadata store, and periodic scanning may additionally prevent method 200 from efficiently processing the browsing and search requests of processes 240 and 250.

Figure 3:
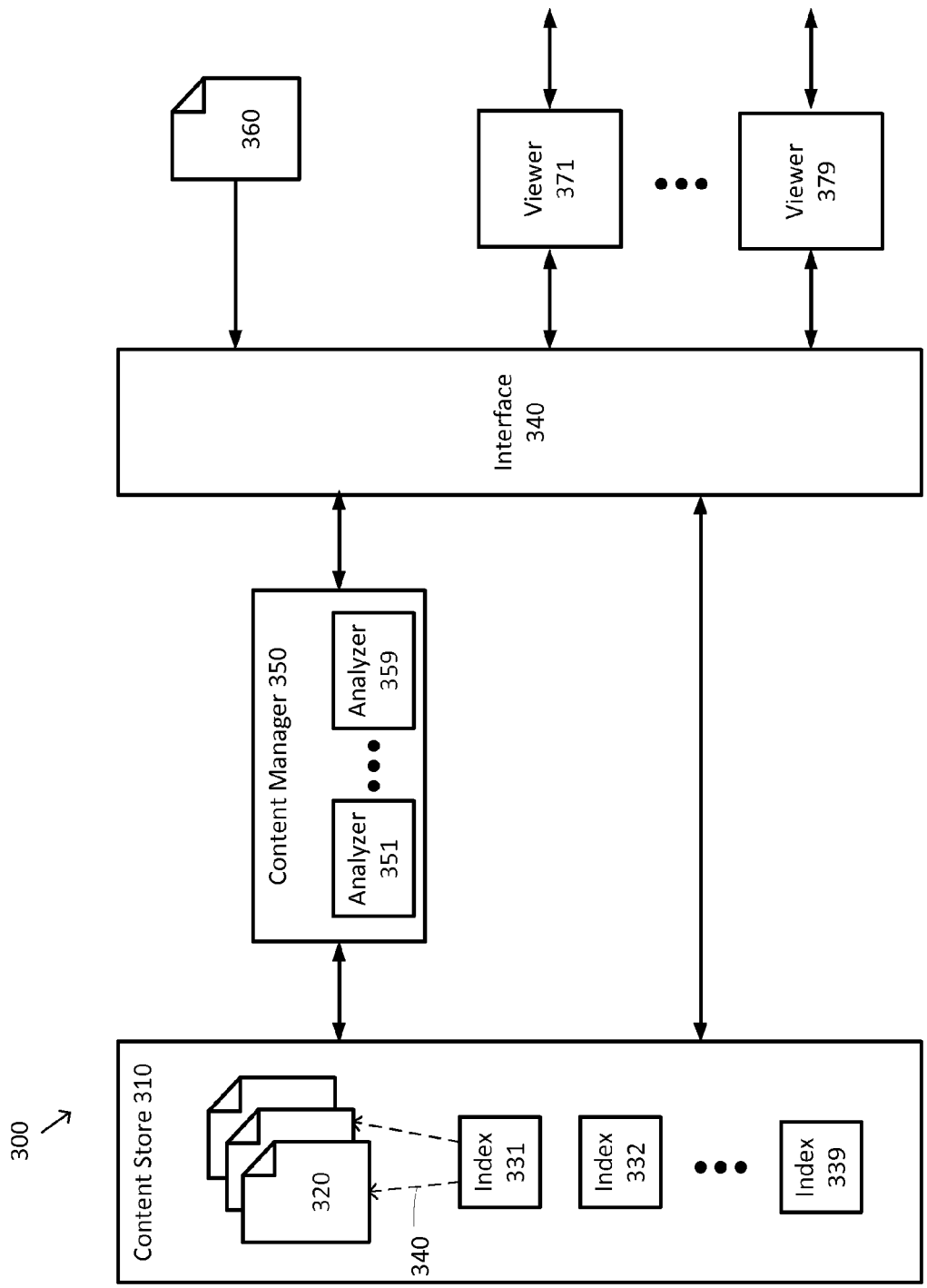
FIG. 3 is a simplified diagram of a content storage system according to some examples.

FIG. 3 is a simplified diagram of a content storage system 300 according to some examples. As shown in FIG. 3, the content storage system or storage archiving system 300 includes a content store or storage archive 310 that is not bound by the single hierarchy structure used in file system 110. Content store 310 may be used to store a plurality of content blocks or storage frames 320. Each of the content blocks 320 may represent a collection of related information. For example, each of the content blocks 320 may represent a word processing document, an audio file, an email, a calendar appointment, and/or the like. Rather than organize or catalog the content blocks 320 into a hierarchy of subdirectories, content store 310 simply stores the content blocks 320 and then locates them using a plurality of indexes or registries 331-339. Each of the indexes 331-339 includes one or more links 340 that link index entries to the content blocks 320. Because the indexes 331-339 provide a many-to-many mapping between the indexes 331-339 and the content blocks 320 such that one or more the indexes 331-339 may each include a respective link or locator 340 to the same content block 320 without having to make copies of that same content block 320. In some examples, one or more of the plurality of indexes 331-339 may be reverse indexes. Although not shown in FIG. 3, it is also possible for the links 340 to reference content blocks stored in other content stores or file systems. In some examples, the links 340 may include uniform resource indicators (URIs) and/or uniform resource locations (URLs) that locate where each of the linked content blocks may be stored. In contrast to the indexes created and maintained by file scanner 180 of FIG. 1, the indexes 331-339 are kept up to date and reflect the current state of the content blocks 320.

In some examples, content store 310 may be located on any kind of storage medium or machine-readable media. Some common forms of machine readable media suitable for content store 310 may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. In some example, content store 310 may be stored in a file system.

Content store 310 provides the ability to organize the content blocks 320 into multiple hierarchies using the indexes 331-339. In some examples, one or more of the indexes 331-339 may be based on path strings that are similar to file paths. The path strings may be used to organize the content blocks 320 into what appear to be one or more hierarchies of virtual subdirectories. Using this approach, the same content block 320 may be identified using different path strings in different virtual subdirectory hierarchies without having to create multiple copies of the content block 320 because the indexes 331-339 refer to the content block using respective links 340.

Content store 310 may also provide the ability to organize the content blocks 320 using more than one hierarchical arrangement. In some examples, one or more of the indexes 331-339 may be used to identify and locate each of the content blocks 320 including the same type of content, such as audio content. For example, the one or more audio content based indexes may organize the audio content blocks based on type (e.g., mp3, aa, etc.) as well as other metadata values, without including index information and links to non-audio content blocks. In some examples, one or more of the indexes 331-339 may be used to identify and locate each of the content blocks 320 by other content information and/or metadata information such as key words stored in the content blocks, content block/file names, project identifiers, dates, categories, user identifiers, and/or the like. In some examples, date information may be used by one or more indexes for identifying most recently accessed and/or modified content blocks 320. In some examples, one or more of the indexes 331-339 may be used to implement version controls that may organize and track each of the versions of content blocks 320. In some examples, one or more indexes may be added to the indexes 331-339 to support dynamic and flexible organization of the content blocks 320.

To be accessible to users, operating systems, applications, and other systems, content store 310 may be accessed using an interface 340. Interface 340 may include any software and/or hardware features to support access to and use of content store 310. For example, interface 340 may be used to receive read, write, and/or informational requests from one or more sources. In some examples, interface 340 may be organized using a client-server model and provide a server interface or façade that may be accessed by the users, operating systems, applications, and/or other systems. In some examples, interface 340 may provide a stateless interface such as a representational state transfer (REST) interface commonly used with web-page based architectures. In some examples, interface 340 may provide APIs, remote procedure calls, web services, messaging passing mechanisms, and/or other interfaces. In some examples, interface 340 may be accessed via one or more networks, including local area networks (LANs) such as an Ethernet and/or wide area networks (WANs) such as the Internet. In some examples, interface 340 may include the ability to place watches that monitor changes in other content stores and/or file systems.

To support the dynamic and flexible organization of the content blocks 320 using the indexes 331-339, whenever content in the content blocks 320 is added, removed, and/or modified to content store 310, the content is processed using a content manager 350. Content manager 350 includes one or more content analyzers 351-359. Each of the content analyzers 351-359 monitors the added, removed, and/or modified content blocks and updates one or more of the indexes 331-339. As an example, content analyzer 351 may be responsible for updating index 331, which, for the purposes of illustration, may be organizing word processing document content blocks based on metadata tags associated with project identifiers. When a new word processing document content block, such as a content block 360, is added to the content store 310 using interface 340, it is forwarded to and then processed by content manager 350 which stores content block 360 as a content block 320 in the content store 310 and where content analyzer 351 adds an entry to index 331 based on the project identifier associated with the added content block 320 and creates a corresponding link 340 from the entry to the added content block 320. Similarly, when a word processing document content block is deleted, content manager 350 and content analyzer 351 will delete the corresponding content block 320 and remove the corresponding entry in index 331 and link 340. When the project identifier for one of the word processing document content blocks changes, content analyzer 351 updates the corresponding entry in index 331. Additionally, others of the content analyzers 351-359 may also make additions, deletions, and/or changes to others of the indexes 331-339 as appropriate. Thus, each of the indexes 331-339 is kept up to date with any changes in the content blocks 320.

To support the flexible and multiple organizations of the content blocks 320 using the indexes 331-339, interface 340 may be accessed using one or more content viewers or retrievers 371-379. Each of the content viewers 371-379 may be designed to request and receive information from the content blocks 320 based on the organization of one or more of the indexes 331-339. In some examples, the content viewers 371-379 may use plug-ins. In some examples, the content viewers may include APIs, remote procedure call interfaces, web services interfaces, and/or the like.

In some examples, a browser content viewer selected from the content viewers 371-379 may retrieve and present content blocks to a user as a hierarchy of content blocks based on the structure and entries in one or more of the indexes 331-339. For example, using one or more indexes 331-339 organizing content blocks for audio files, the browser content viewer may retrieve and present the audio file content blocks using playlists, artists, albums, dates, and/or other metadata fields. Further, where appropriate, the audio file content blocks may be presented in hierarchical form. In some examples, the metadata identifying the audio file content blocks may be further combined with other metadata, which may be used to support browsing for audio file content blocks modified in the last day, week, month, and/or other time period.

In some examples, a version tracking content viewer selected from the content viewers 371-379 may receive and present content blocks based on revision histories. Using one or more indexes 331-339 that track versions and changes to content blocks, the version tracking content viewer may present a tree showing different versions of a content block including edit and/or fork points in a history of the content block. The version tracking content viewer may further present any of the edit and/or fork points by providing a difference between the two versions of the content block.

In some examples, a search content viewer selected from the content viewers 371-379 may provide a search interface for identifying and locating content blocks based on a search query. Unlike other index-based content viewers, processing for the search content viewer may include scanning each of the content blocks 320 to determine content blocks matching the search query. In some examples, the search content viewer may additionally create one or more new indexes based on the search query, add the new indexes to the indexes 331-339, and create and add a corresponding new content analyzer to the content analyzers 351-359 so that the new indexes are updated as the content blocks 320 are updated. In some examples, the creation of the new indexes and the new content analyzers further supports the ability to dynamically create and support new organizational structures among the content blocks 320. In some examples, the new content analyzers may be added to content manager 350 using plug-ins and/or the like.

In some examples, other content viewers selected from the content viewers 371-379 may provide one or more façade interfaces for interface 340 that make the content store 310 compatible with other content stores and/or file systems. For example, a content viewer selected from the content viewers 371-379 may be used to provide content store 310 with a POSIX-compliant interface making content store 310 appear to be a hierarchical file system similar to file system 110 and interface 120. In some examples, one or more of the content viewers may include the ability to place watches that monitor changes in other content stores and/or file systems.

According to certain examples, content storage system 300 may provide one or more advantages over file storage system 100. In some examples, indexes 331-339 allow the content blocks 320 to be organized using any number of arrangements, both hierarchical and otherwise, instead of the single hierarchy based on file paths that constrains file storage system 100. In some examples, the indexes 331-339 are integrated into content store 310 and do not use the potentially separate storage typically found when using metadata store 160. Further, the tight coupling of the indexes 331-339 with the content store 310 may also eliminate overhead associated with accessing the more loosely coupled metadata store 160. In some examples, accessing the content blocks 320 through the indexes 331-339, which may be optimized, may incur less processing overhead than traversing the hierarchy of subdirectories in the file system 110 to reach and access a file. In some examples, the processing overhead may be significantly lower than having to perform a search with each browsing and/or search request because repeated retrieval of a view based on an index does not trigger a search of the content blocks.

In some examples, the automatic processing of content changes by content manager 350 and the content analyzers 351-359 may reduce and/or eliminate manual intervention during the metadata tagging process as the content analyzers 351-359 may more completely include rules for the metadata tagging. In some examples, up to date maintenance of indexes 331-339 by content manager 350 and the content analyzers 351-359 may avoid the limitations of the periodic file scanner 180 that may often leave the metadata store 160 out of date. In some examples, the ability to dynamically add new indexes and content analyzers provides the ability to create additional organizational arrangements to the content blocks 320 without losing the prior organizational arrangements. In some examples, content storage system 300 may further include built-in version tracking. In some examples, content storage system 300 may reduce storage overhead by reducing the number of duplicate content blocks being stored in the content store 310.

Figure 4:
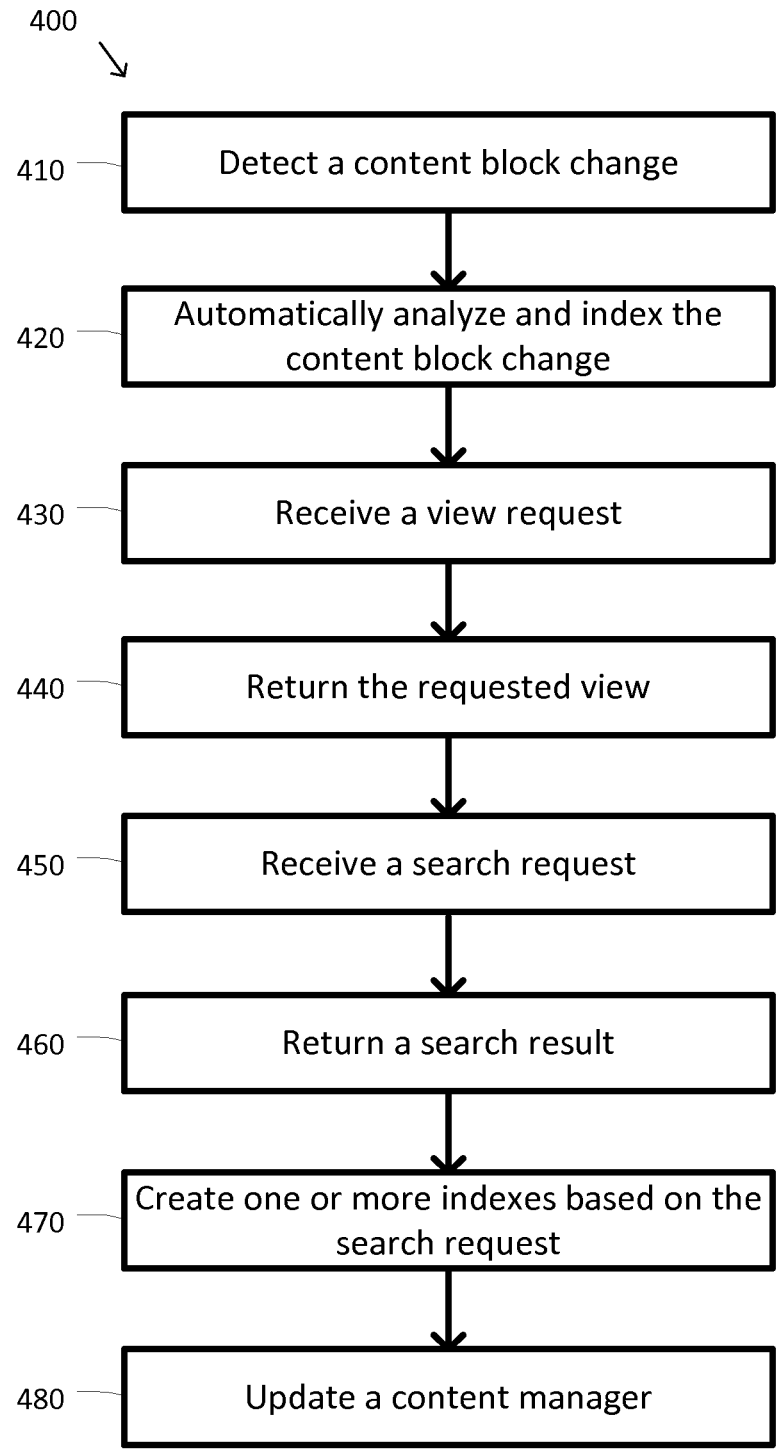
FIG. 4 is a simplified diagram of a method of managing content blocks according to some examples.

FIG. 4 is a simplified diagram of a method 400 of managing content blocks according to some examples. As shown in FIG. 4, the method 400 includes a process 410 for detecting a content block change, a process 420 for automatically analyzing and indexing the content block change, a process 430 for receiving a view request, a process 440 for returning the requested view, a process 450 for receiving a search request, a process 460 for returning a search result, a process 470 for creating one or more indexes based on the search request, and a process 480 for updating a content manager. According to certain examples, the method 400 of managing content blocks can be performed using variations among the processes 410-480 as would be recognized by one of ordinary skill in the art. In some examples, one or more of the processes 470 and/or 480 are optional and may be omitted. In some examples, one or more of the processes 410-480 of method 400 may be implemented, at least in part, in the form of executable code stored on non-transient, tangible, machine readable media that when run by one or more processors (e.g., one or more processors in a content storage system) may cause the one or more processors to perform one or more of the processes 410-480.

At the process 410, a content block change is detected. A content block change may be detected whenever information and/or content in a content block changes, a new content block is to be stored, and/or an existing content block is be deleted. In some examples, a content block change may be detected when the content block 360 is presented for storage in content store 310. In some examples, a content block change may be detected whenever one of the content blocks 320 is modified and/or deleted. In some examples, the content block change may be detected based on a watch monitoring another content store and/or a file system.

At the process 420, the content block change is automatically analyzed and indexed. Based on the content change detected during process 410, one or more indexes in the content store are updated. In some examples, the one or more indexes may be included in the indexes 331-339. In some examples, the updates made to the one or more indexes may be determined by one or more content analyzers, such as the content analyzers 351-359. The updates may depend on details of the content block change. When the content block change includes storage of a new content block, the one or more indexes may be updated to add one or more additional entries based on the new content block, metadata associated with the new content block, and the information and content included in the new content block. When the content block change includes deletion of an existing content block, entries with links to the existing content block may be removed from the one or more indexes. When the content block change includes, changes made to an existing content block, the update may include adding, removing, and/or changing entries in the one or more indexes.

At the process 430, a view request is received. Using an interface, such as interface 340, a view request may be received by the content storage system. In some examples, the view request may be received via an API call, a remote procedure call, a web service call, receipt of a message over a network, and/or the like. In some examples, the view request may be received from a user, an application, an operating system, another system, and/or a content viewer such as content viewers 371-379. In some examples, the view request may include a request to browse content blocks indexed by one or more indexes. In some examples, the view request may include a request for a tracking history of one or more content blocks. In some examples, may include a request received via a file system interface, such as a POSIX-compliant interface.

At the process 440, the requested view is returned. Based on the view request received during process 430, the interface and/or a content viewer accesses the one or more indexes of the content store to identify and locate content blocks matching the view request. In some examples, the matching content blocks are returned in list form, via one or more data structures, using a dialog box or other display, and/or the like.

At the process 450, a search request is received. Using an interface, such as interface 340 a search request may be received by the content storage system. In some examples, the search request may be received via an API call, a remote procedure call, a web service call, receipt of a message over a network, and/or the like. In some examples, the search request may be received from a user, an application, an operating system, another system, and/or a search content viewer. In some examples, the search request may include a request to search the content blocks stored in the content storage system that satisfy search parameters of the search request.

At the process 460, the requested search is returned. Based on the search request received during process 450, the interface and/or the search content viewer may access the one or more indexes of the content store to identify and locate content blocks matching the search parameters. When the search request cannot be satisfied based on the one or more indexes, the interface and/or the search content viewer may scan the content blocks stored in the content storage system to identify and locate content blocks matching the search parameters. In some examples, the matching content blocks are returned in list form, via one or more data structures, using a dialog box or other display, and/or the like.

At the optional process 470, one or more indexes may be created based on the search request. When the search request received during process 450 may be regularly repeated and/or suggest a new organizational arrangement for the content blocks stored in the content storage system, one or more new indexes may be created to support the repeated searches and/or the new organizational arrangement. The one or more new indexes may then be added to the content storage system for later reuse.

At the optional process 480, the content manager may be updated. One or more new content analyzers are created that can analyze and index the content blocks and maintain the new indexes added to the content storage system during process 470. The new content analyzers may also be installed into the content manager so that any subsequent content block changes will be analyzed by the new content analyzers during the automatic analysis of content changes during process 420. In this way, the new indexes added during process 470 may be kept up to date.

Some examples of a content storage systems and/or file storage systems may include non-transient, tangible, machine readable media that include executable code that when run by one or more processors may cause the one or more processors to perform the processes of methods 200 and/or 400. Some common forms of machine readable media that may include the processes of methods 200 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A content storage system, the system comprising:
    a content store for storing a plurality of first content blocks and one or more first indexes;
    a content manager including one or more first content analyzers; and
    an interface for receiving access requests for the plurality of first content blocks;
    wherein:
        each of the one or more first indexes includes a plurality of first entries for organizing a plurality of second content blocks from the plurality of first content blocks according to a respective organizational structure;
        each of the first entries includes a link to a respective content block from the plurality of second content blocks; and
        each of the plurality of content analyzers monitors the plurality of first content blocks for changes and updates a second index from the one or more first indexes based on information associated with the monitored changes.

2. The system of claim 1 wherein:
    the monitored changes include addition of a third content block for storage in the content store;
    the third content block is stored in the content store; and
    the second index is updated by adding a second entry including a link to the third content block to the second index.

3. The system of claim 1 wherein:
    the monitored changes include deleting a third content block stored in the content store; and
    the second index is updated by deleting a second entry that includes a link to the third content block.

4. The system of claim 1 wherein:
    the monitored changes include modifying a third content block stored in the content store; and
    the second index is updated by updating a second entry that includes a link to the third content block based on a modification made to the third content block and the respective organizational structure.

5. The system of claim 1 wherein a first respective organizational structure associated with a third index organizes a plurality of third content blocks selected from the plurality of first content blocks according to a first hierarchy.

6. The system of claim 5 wherein a second respective organizational structure associated with a fourth index from the one or more first indexes organizes a plurality of fourth content blocks selected from the plurality of first content blocks according to a second hierarchy.

7. The system of claim 1 wherein the respective organizational structure associated with a third index organizes a plurality of third content blocks from the plurality of first content blocks based on metadata associated with the plurality of third content blocks.

8. The system of claim 1 wherein each of the plurality of first content blocks are files and the content store is a file system.

9. The system of claim 1 wherein the link of one of the first entries includes a uniform resource locater for specifying a location of a third content block in another content store or a file in a file system.

10. The system of claim 1 wherein the access requests are received by the interface from a content viewer.

11. The system of claim 10 wherein the content viewer is a browsing viewer for retrieving content blocks based on a third index from the one or more first indexes.

12. The system of claim 10 wherein the content viewer adds a façade interface to the interface.

13. The system of claim 12 wherein the façade interface is POSIX compliant.

14. The system of claim 10 wherein the content viewer is a search viewer for retrieving one or more of the plurality of first content blocks based on search parameters.

15. The system of claim 14 wherein the search parameters are used to create a third index and a second content analyzer for updating the third index, the third index is added to the one or more first indexes, and the second content analyzer is added to the one or more first content analyzers.

16. The system of claim 10 wherein the content viewer is a version tracking viewer for retrieving one or more versions of a third content block selected from the plurality of first content blocks.

17. A method of managing content blocks, the method comprising:
    storing a plurality of first content blocks and one or more first indexes in a content store;
    organizing a plurality of second content blocks from the plurality of first content blocks using a second index from the one or more first indexes according to a first organizational structure;
    linking each of the plurality of second content blocks using respective links stored in corresponding entries of the second index;
    monitoring the plurality of first content blocks using a content manager including one or more first content analyzers;
    updating the second index using a second content analyzer from the one or more first content analyzers based on changes detected in the plurality of first content blocks; and
    receiving access requests for the plurality of first content blocks via an interface.

18. The method of claim 17 wherein:
    the first respective organizational structure organizes the plurality of second content blocks according to a first hierarchy; and
    the method further comprises:
        organizing a plurality of third content blocks from the plurality of first content blocks using a third index from the one or more first indexes according to a second hierarchy;
        linking each of the plurality of third content blocks using respective links stored in corresponding entries of the third index; and
        updating the third index using a third content analyzer from the one or more first content analyzers based on changes detected in the plurality of first content blocks.

19. The method of claim 17 wherein:
    the access requests include a search request including search parameters;

the search request is received by the interface from a search viewer; and the method further comprises:
retrieving one or more of the plurality of first content blocks based on the search parameters;
creating a third index based on the search parameters;
adding the third index to the one or more first indexes;
creating a second content analyzer for updating the third index; and
adding the second content analyzer to the one or more first content analyzers.

20. A non-transitory machine-readable medium comprising a plurality of machine-readable instructions which when executed by one or more processors associated with a storage archive are adapted to cause the one or more processors to perform a method comprising:
archiving a plurality of first storage frames and one or more first registries in the storage archive;
cataloging a plurality of second storage frames from the plurality of first storage frames using a second registry from the one or more first registries according to a first catalog structure;
referencing each of the plurality of second storage frames using respective locators stored in corresponding entries of the second registry;
monitoring the plurality of first storage frames using an archive monitor including one or more first registry updaters;
updating the second registry using a second registry updater from the one or more first registry updaters based on changes detected in the plurality of first storage frames;
receiving a search request including search parameters via a frame retriever;
identifying one or more of the plurality of first storage frames based on the search parameters;
creating a third registry based on the search parameters;
adding the third registry to the one or more first registries;
creating a second registry updater for updating the third registry; and
adding the second registry updater to the one or more first registry updaters.

* * * * *